Dec. 11, 1951   B. P. McKINLEY   2,577,974
ELECTRICAL OUTLET
Filed Sept. 29, 1948   2 SHEETS—SHEET 1
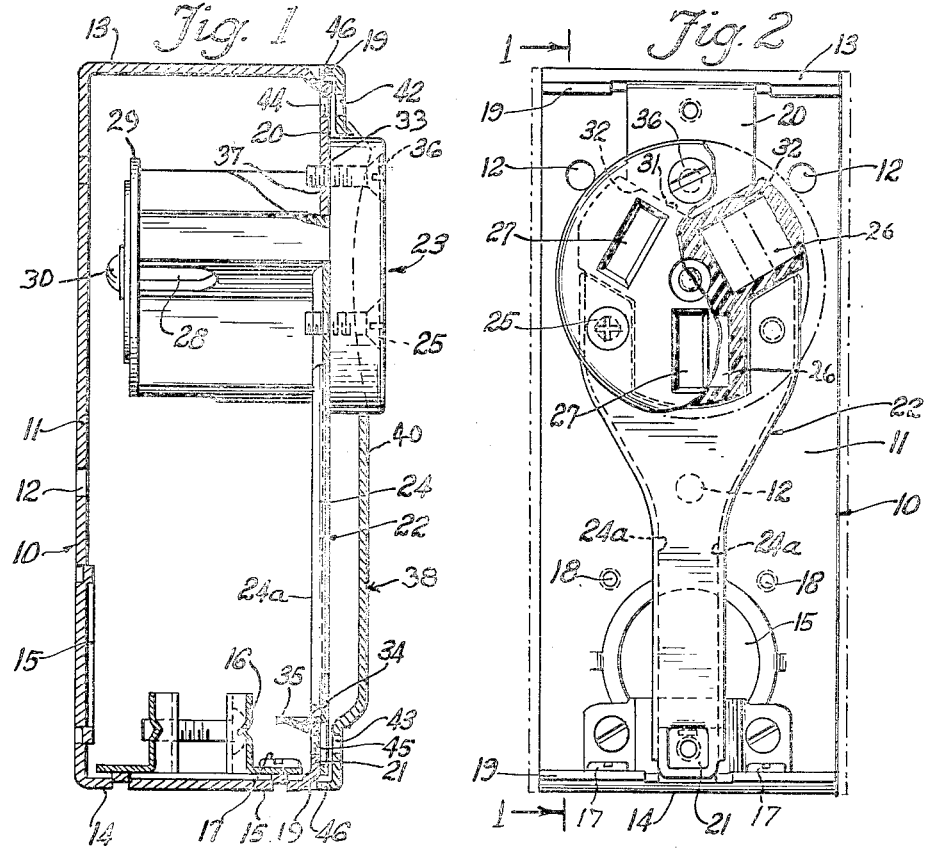
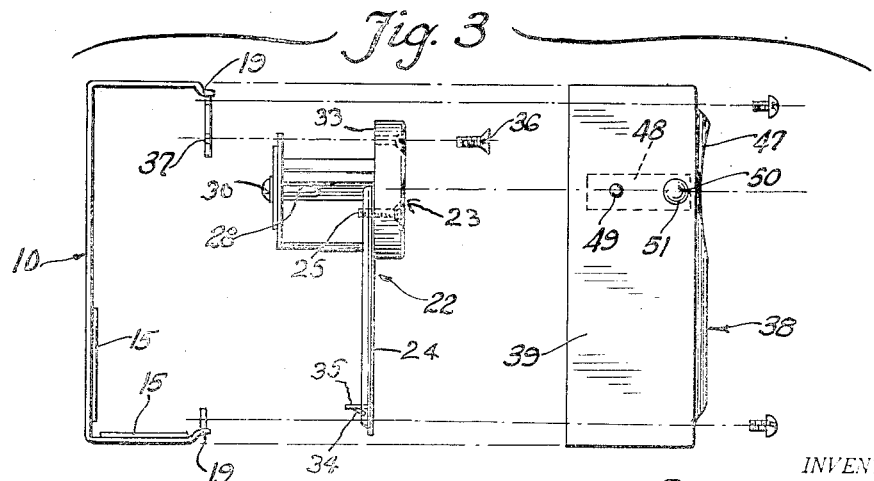
INVENTOR.
Benjamin P. McKinley
BY
Sheridan, Davis & Cargill
attys Dec. 11, 1951   B. P. McKINLEY   2,577,974
ELECTRICAL OUTLET
Filed Sept. 29, 1948   2 SHEETS—SHEET 2

INVENTOR.
Benjamin P. McKinley
BY Sheridan, Davis & Cargill
Attys

Patented Dec. 11, 1951

2,577,974

UNITED STATES PATENT OFFICE 2,577,974

ELECTRICAL OUTLET

Benjamin P. McKinley, Evanston, Ill.

Application September 29, 1948, Serial No. 51,731

3 Claims. (Cl. 174—53)

This invention relates to improvements in electrical outlets.

One object of the invention is to provide an improved box for electrical outlet receptacles and an improved receptacle assembly for use in the box.

Another object of the invention is to provide an improved outlet box of the surface type that not only is of simple construction but which by reason of the construction facilitates the assembly therein of a suitable outlet receptacle and the making of the necessary connections of the receptacle contacts to the current conductors.

Another object of the invention is to provide an improved outlet box open at two opposed walls and a cover of complementary design which in operative position on the box provides an approved inclosure for the terminal ends of conductors and of the receptacle contacts within the box.

An additional object of the invention is to provide a simple outlet box and an outlet sub-assembly that can be snapped readily into a predetermined position thereon after connecting the receptacle terminals to the conductor ends within the box, thereby facilitating the installation of an electrical outlet.

Other objects of the invention relate to various features of construction and arrangement of parts which will be apparent from a consideration of the following specification and accompanying drawings which disclose a structure that is illustrative of the present invention.

In the drawings, Figure 1 is a longitudinal sectional view taken on line 1—1 of Fig. 2 showing an outlet box, a receptacle sub-assembly therein and in addition a cover thereon, the electrical conductors and connections of the same to the contact terminals of the receptacle not being shown;

Fig. 2 is a broken front elevational view of an improved box with a receptacle sub-assembly in position thereon, the cover not being shown;

Fig. 3 is an exploded view in side elevation of the improved outlet box, the receptacle sub-assembly and the cover;

Figure 4:
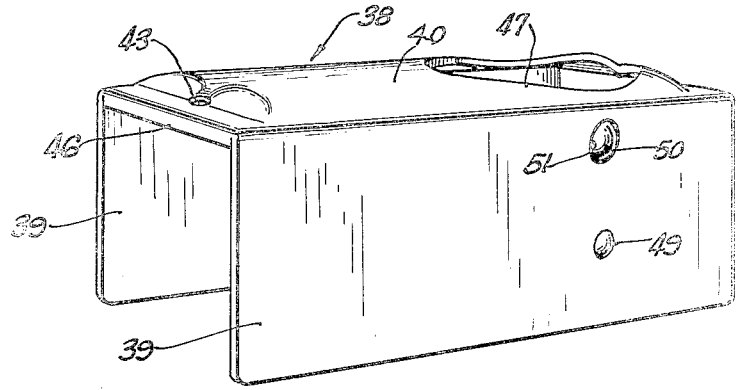
Fig. 4 is a perspective view of the cover.
Figure 5:
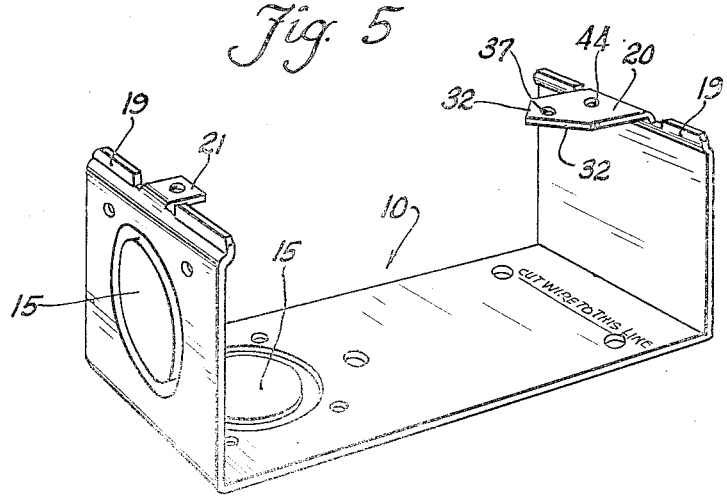
Fig. 5 is a perspective view of the box or base.

In the drawing, the box shown is adapted to be mounted on the surface of a wall and is indicated generally by the numeral 10. The box comprises a base 11 provided with suitably located screw openings 12 for mounting purposes, the base being provided with integral end walls 13 and 14. Hence, the box proper can be made essentially of a strip of metal, the box being open at the sides in the form of the invention illustrated.

The base 11 and the end wall 14 are shown each provided with conventional knock-outs 15 for selective use in bringing the conductor cables or wires into the box. A conventional cable or box clamp 16 is shown attached by screws 17 to the end wall 14 for clamping the end of the cable within the box where it is brought in through the end knock-out. Where the cable enters from the rear knock-out, the clamp is attached about the rear knock-out opening by the screws 17, additional tapped openings 18 being provided for that purpose as is conventional.

The upper edges of the end walls 13 and 14 are off-set inwardly from the plane of the walls as indicated at 19, the amount of off-set corresponding approximately to the thickness of the metal of which the cover, hereinafter described, is formed. The walls 13 and 14 also are provided with inwardly directed tabs or flanges 20 and 21, respectively, as illustrated. These tabs, as will be described later, cooperate with a receptacle sub-assembly in positioning the latter in proper position on the box and, by cooperation with the sub-assembly, as later described, provide initial snap-action attachment of the sub-assembly to the box. Thus, when an electrician has connected the conductor wires previously brought into the box through one of the knock-out openings to the terminals of the receptacle contacts, the receptacle sub-assembly is snapped into position on the box. The tabs not only support the sub-assembly but insure automatically the proper positioning of the assembly on the box including registration of screw receiving openings for firmly attaching the sub-assembly as well as the cover to the box.

The sub-assembly above mentioned, indicated generally by numeral 22, comprises a receptacle indicated generally by numeral 23 and a supporting arm 24 secured thereto by rivets or as shown by screws 25, which are shown as being of the so called "Phillip" head type and not removable by means of a conventional screw driver. The initial assembly of the receptacle and arm is intended to be permanent and is made at the factory.

The receptacle 23 comprises a Bakelite or other suitable insulating housing providing cells 26 (three being shown) for receiving contact members (not illustrated) but preferably of the type shown in my pending application Serial No. 575,115, filed January 29, 1945, now Patent No.

2,459,832, granted January 25, 1949. Registering with each cell is a slot or opening 27 in the forward face of the receptacle each for receiving a contact blade of an appliance plug, not shown, but of conventional form. The walls of the cells are provided with openings or slots 28 through which the conductor wires extend that are connected to the contact terminals, the openings all facing toward the lower end wall 14 of the box. The bottom ends of the cells are open except when closed by the disc insulator 29. Hence with the contacts removed from the cells, the bared ends of the conductors can be attached to the contact terminal and the contacts then replaced in the cells and the disc 29 replaced and retained by a screw 30. Such connection of the conductors to the contacts is effected before the sub-assembly 22 is placed in the position shown in the drawings but with the assembly disposed adjacent the box. After attachment of the conductor wires to the terminals, as mentioned, the sub-assembly is snapped into position on the tabs 20 and 21 of the box.

For the purposes of enabling the sub-assembly to be snapped into the proper position, the forward side of the receptacle 23 is provided with an exterior wall portion 31 of re-entrant formation as shown in Fig. 2. The angle formed by the portions of the wall 31 corresponds to the angle formed by the convergent edges 32, 32 of the tab 20. The outer end of the receptacle is shown as circular and extends over the re-entrant surface 31 thereby providing a ledge or overhanging stop 33 that rests on the tab 20 for support. Upon placing the receptacle in position on the tab 20, the electrician presses down on the free end of the arm 24 when in registration with the other tab 21 to cause a catch 34, provided in the inwardly pressed tongue 35 of the arm to snap beneath the edge of the tab 21. The end wall 14 of the box flexes outwardly sufficiently under the camming action of the catch 34 to enable the described latching action to take place.

It will be noted that the arm 24 is provided with downwardly turned marginal flanges 24a which not only stiffen the arm but at the lower or narrow end of the arm they are spaced apart a distance corresponding substantially to the width of the tab 21 and hence constitute guides that center the lower end of arm 24 with respect to the tab 21 and prevent lateral displacement of the arm from the tab.

The tabs 20 and 21, as will be noted, cooperate with the sub-assembly to locate the latter in a proper position with respect to the box, which position is shown in Fig. 2 to be the longitudinal center line of the box. Since the lower or small end of the arm is latched to the tab 21 by the catch 34 against upward movement (except by first deflecting the end wall 14 of the box outwardly) no additional fastening means for this end is required in securing the sub-assembly to the box. However, a conventional screw 36 is provided for securing the receptacle to the tab 20 for resisting the outward pull on the sub-assembly that occurs when an appliance plug is removed from the receptacle. The screw 36 is inserted in an unthreaded opening in the receptacle which, when the sub-assembly is in the described latched position on the tabs, registers with a tapped hole 37 in the tab 20. Hence in securing the sub-assembly firmly to the box, the electrician inserts the one screw 36 only.

A cover specifically designed to reinforce the box is shown in the drawing and designated generally by numeral 38. The cover, like the box, is of metal, preferably, and is provided with side walls 39 but has no end walls and when placed in position on the box which has end walls but no side walls, cooperates with the box to provide a complete inclosure for the conductor ends and other elements within the box.

The front or forward portion 40 of the cover overlies the front of the box while the side walls 39 of the cover closely telescope over the respective edges of the ends and base of the box. The central portion of the cover is raised, as shown in Fig. 1 to stiffen the cover and is provided with screw openings 42 and 43 which register with the openings 44 and 45 of the tabs 20 and 21, respectively.

For the purpose of rigidifying the complete assembly, the end portions of the front of the cover are provided with inturned flange 46 which overlies the inwardly turned or off-set portions 19 of the end walls 13 and 14. Hence the cover forms, in effect, a lock which restrains outward deflection of either end wall of the box and prevents unlatching of the lower or small end of the arm 24 from the tab 21 while the cover is in position on the box. The cover is provided with an aperture 47 through which the face portion of the receptacle projects when the cover is in position, as shown in Fig. 1.

Where the outlet described is to be used with an appliance plug that is provided with conventional grounding clips, the cover is provided on the inside of each side wall with opposed flexible strips 48 each riveted adjacent an end to the respective side wall as at 49 and provided near the other end with a semi-spherical contact 50 which projects through a recess 51 in the respective side wall. The contacts 50 make electrical contact with the ground clips of the plug referred to when the latter is plugged into the receptacle and are retained firmly in contact with the clips by the resilient strips 48.

It will be noted that while the box itself is formed of a base plate having end walls only and the cover is formed of a forward plate having side walls only, the box and cover cooperate when assembled to provide a tight inclosure. The elimination of side walls from the box makes the interior of the box accessible from either side and renders the making of the necessary electrical connections more convenient. Economy in manufacture of the box and cover from metal essentially of strip form is effected by eliminating material waste and simplifying forming operations.

While the receptacle shown in the drawings is for a three wire system, the novel features of the improvements may be used with receptacles for other systems without departure from the spirit of the invention defined by the following claims.

I claim:

1. In combination, an outlet receptacle box comprising a base having end walls disposed in planes normal to the base, one of said end walls having an inwardly directed aligning tab, the other end wall being provided with an inwardly directed latch and aligning member, at least one of said end walls being outwardly deflectible slightly to enable said aligning tab and said latch and aligning member to be sprung farther apart for accommodating a receptacle assembly between the same, and a receptacle assembly provided with formations one adapted for cooperation with said aligning tab and the other comprising a catch member for cooperation with said inwardly directed latch and aligning member upon inserting the assembly between the tab and member for effecting predetermined alignment of the assembly with respect to the box and the releasable securement of the assembly to the box in the said predetermined position.

2. In combination a U-shaped outlet box open at the sides and comprising a base member provided with end walls disposed in planes normal to the base, said end walls being provided with inwardly directed supporting tabs, said walls being adapted to be flexed outwardly slightly in accommodating a receptacle assembly between and in supporting relation on said tabs, a receptacle assembly having formations arranged for support by said tabs including a latching member adapted to cam the walls outwardly slightly in pressing the assembly into final supporting position on said tabs, and a cover for the box comprising a top plate having an aperture for the receptacle and side walls for closing the side openings of the box and means for engaging the end walls of the box for preventing outward deflection of the end walls while the cover is in position in the box.

3. In combination, an outlet box comprising a metal base having integral end walls disposed in planes normal to the base and adapted to be flexed outwardly slightly for accommodating insertion therebetween of an outlet receptacle assembly, each of said end walls being provided with an inwardly directed supporting tab for supporting a receptacle assembly in position in the box, and a receptacle assembly comprising an outlet receptacle of insulating material provided with an arm secured at one end to the receptacle, said receptacle being provided with an aligning recess for receiving one of said tabs and the free end of the arm being provided with a camming latch formation arranged for cooperation with the other tab for effecting an outwardly directed thrust on said tab for flexing said end walls outwardly slightly as the free end of the arm is pressed into latching position with respect to said tab whereby the assembly is seated in final aligned position with a snap action.

BENJAMIN P. McKINLEY.

REFERENCES CITED

The following references are of record in the file of this patent:

UNITED STATES PATENTS

| Number | Name | Date |
|---|---|---|
| 1,072,009 | Keefe | Sept. 2, 1913 |
| 1,771,498 | Petersen | July 29, 1930 |
| 1,909,136 | Thomas, Jr. | May 16, 1933 |
| 2,014,442 | Miller | Sept. 17, 1935 |
| 2,075,547 | Rutherford | Mar. 30, 1937 |
| 2,196,786 | Wahl | Apr. 9, 1940 |
| 2,433,917 | McCartney | Jan. 6, 1948 |

FOREIGN PATENTS

| Number | Country | Date |
|---|---|---|
| 371,718 | England | Apr. 28, 1932 |
| 584,869 | Germany | Sept. 14, 1933 |